United States Patent

[11] 3,595,401

| [72] | Inventors | Alexander D. Cormack;<br>Philip G. Bump, both of Pittsfield, Mass. |
|---|---|---|
| [21] | Appl. No. | 859,727 |
| [22] | Filed | Sept. 22, 1969 |
| [45] | Patented | July 27, 1971 |
| [73] | Assignee | Beloit Corporation<br>Beloit, Wis. |

[54] POLYDISC FILTER
10 Claims, 6 Drawing Figs.

[52] U.S. Cl..................................... 210/331,
29/163.5, 210/347, 210/541, 210/542
[51] Int. Cl...................................... B01d 33/38,
B01d 33/36
[50] Field of Search.......................... 29/163.5;
210/331, 347, 541, 542, 330

[56] References Cited
UNITED STATES PATENTS
3,080,064 3/1963 Giesse.......................... 210/330 X
FOREIGN PATENTS
1,009,952 11/1965 Great Britain................ 210/331

Primary Examiner—Frank A. Spear, Jr.
Attorney—Hill, Sherman, Meroni, Gross & Simpson ABSTRACT: A polydisk filter centershaft is fabricated by first welding a plurality of spaced-apart bars around a conventional center pipe shaft weldment. The outside diameter across these bars is machined to give dimensionally stable reference point. A pair of stainless steel plates are then formed into the skin of the centershaft by cutting rectangular holes therein and rolling each of the plates to form one-half of the outside of the centershaft as elements of semicircular cross section. Troughs for carrying the filtered liquid are rectangular holes. One end of these troughs are blocked off and the opposite, or discharge, ends are to be fit into openings cut in a semicircular plate which is formed to fit the center pipe shaft. The two skin assemblies are slid over the pipe shaft and are plug welded to the bars. The two axial seams on the skin are then welded to form a continuous outer surface of the shaft. The filter sectors are located by sets of tabs or projections which fit into the rectangular holes and are clamped to the shaft by rods with a gasket sealing the sector to the shaft.

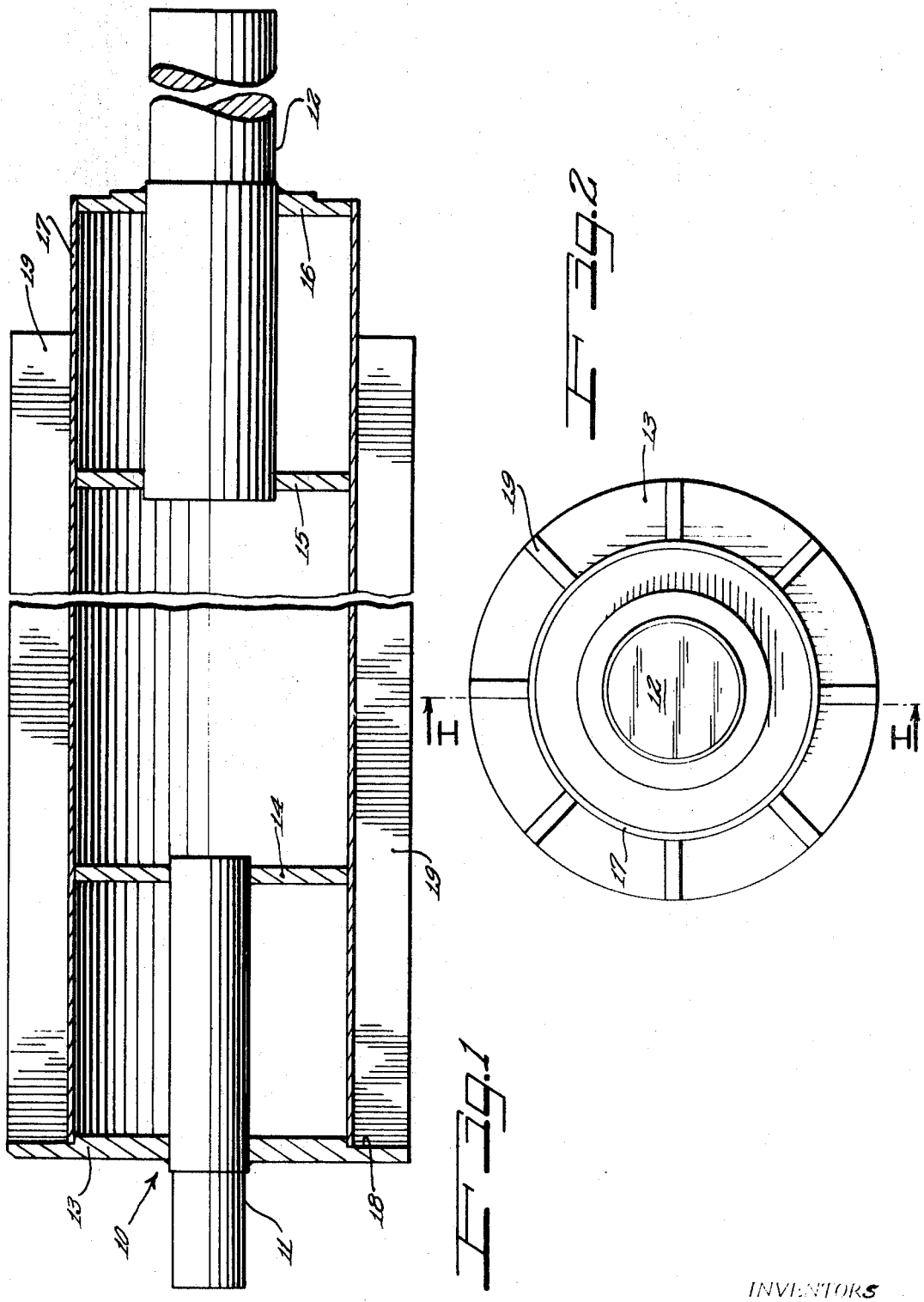

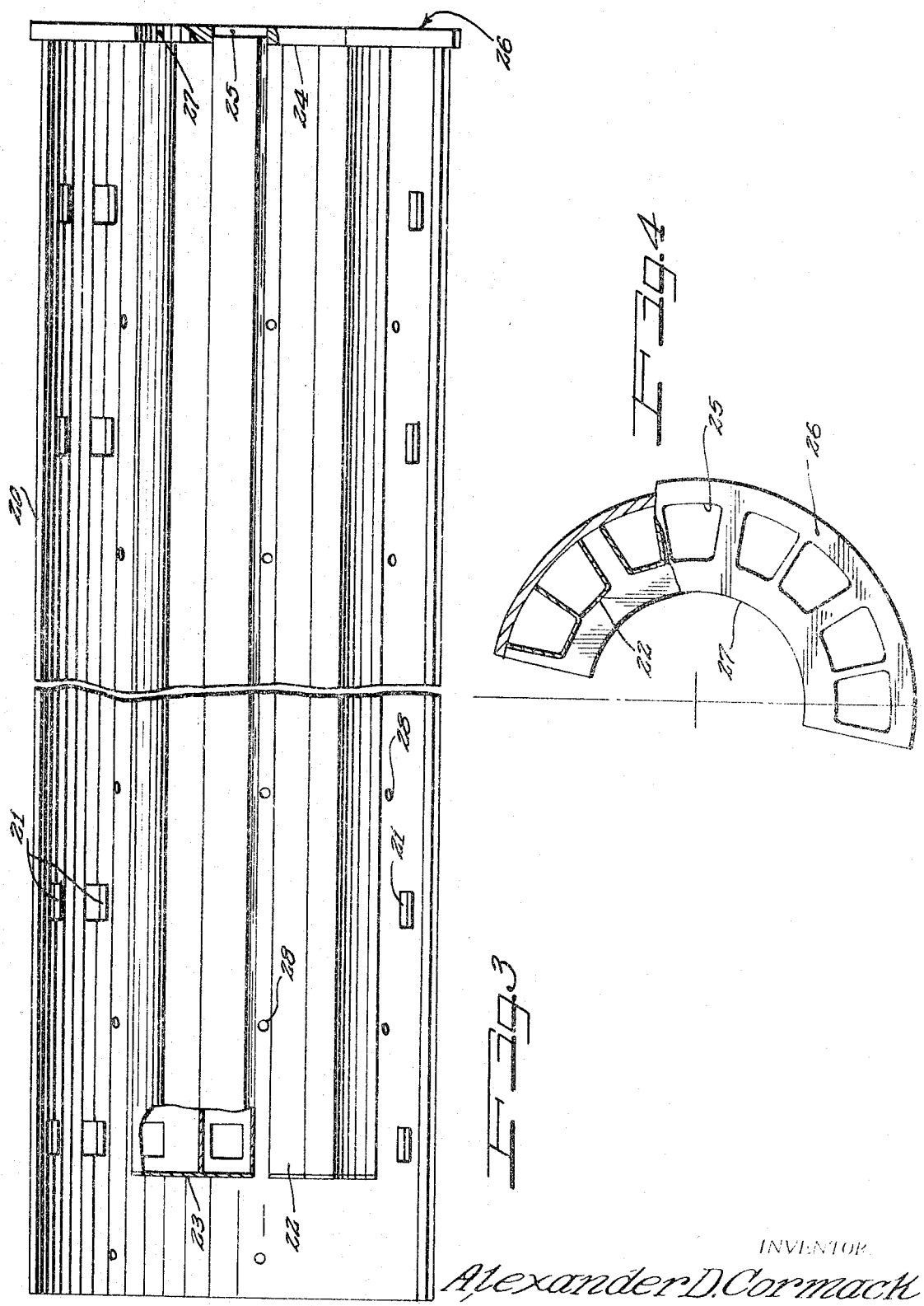

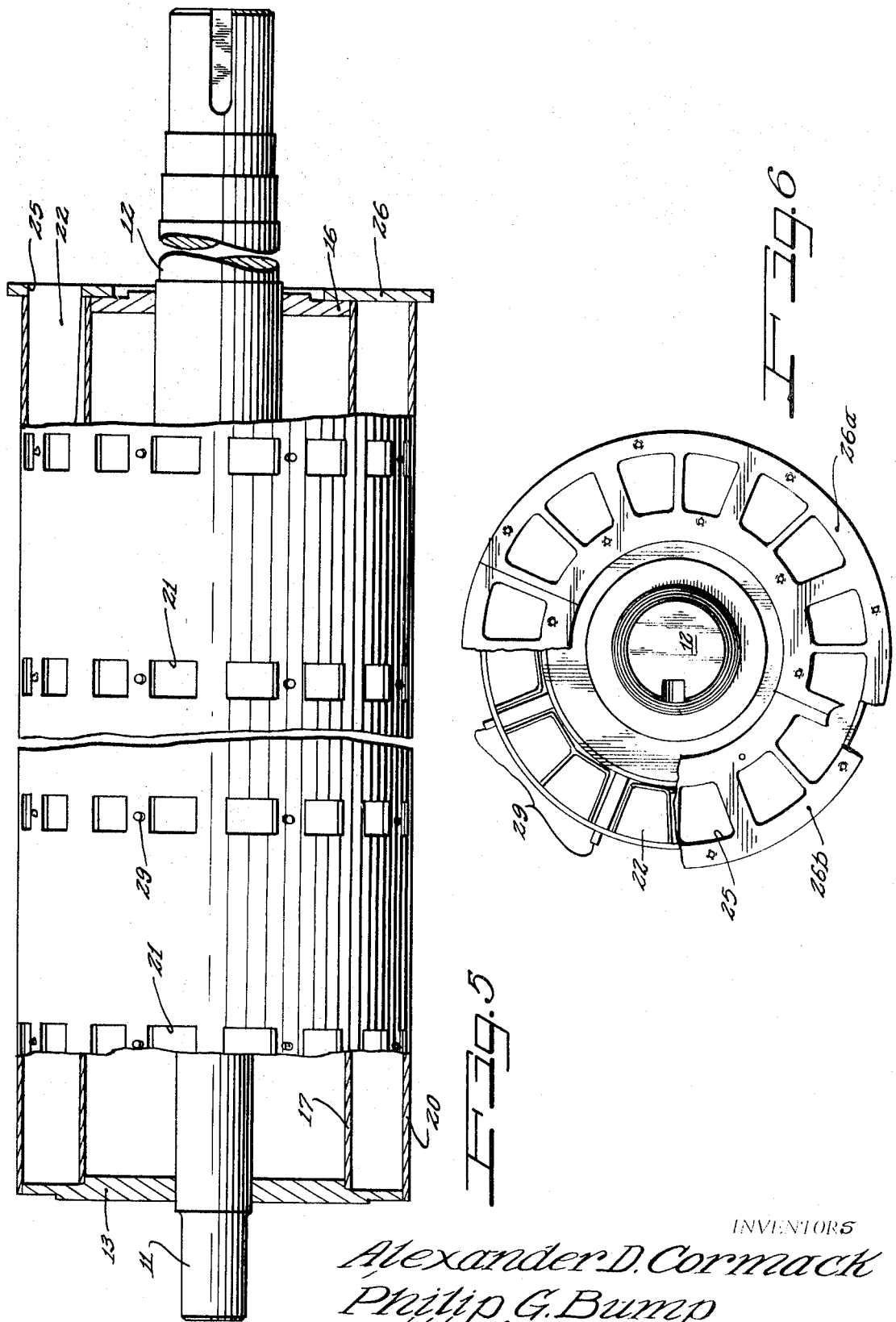

3,595,401

POLYDISC FILTER

BACKGROUND OF THE INVENTION

1. Field of the Invention

This invention relates to polydisk filter apparatus, and more particularly to centershaft apparatus for polydisk filters and the method of fabricating such centershaft apparatus.

2. Prior Art polydisk filters are well known in the art and have heretofore been employed to create advantage. However, the centershaft apparatus which carries the filter sectors has proven to be relatively expensive in that the centershaft has heretofore required a number of pieces in its fabrication which required a great deal of machining. The number of pieces and the machining time, of course, increases the amount of material necessary for fabrication and, accordingly, the time involved in forming, machining, and assembling the number of pieces into a polydisk filter centershaft.

It is therefore highly desirable and a primary object of the present invention, to provide a polydisk filter centershaft which requires fewer piece parts, less machining of these parts, and less fabrication time than heretofore known.

SUMMARY OF THE INVENTION

According to one embodiment of the invention, a polydisk filter centershaft is provided by stitch welding a conventional center pipe shaft weldment a plurality of equally spaced longitudinally extending bars, the outside diameter defined by the attached bars providing a stable reference point due to machining of these bars. Two skin assemblies are then formed from a pair of stainless steel plates each of which has a plurality of rectangular holes cut therein and spaced to provide openings for the filter sectors. Each of these plates, after having the holes cut therein, is rolled to form one-half of the outside of the centershaft assembly.

A plurality of troughs for carrying the filtered liquid are formed and welded to the interior of the rolled plates to form the skin assemblies. The skin assemblies are placed over the pipe shaft weldment and welded to the longitudinal bars and the tow axial seams on the skin are welded to form a continuous outer surface of the centershaft.

BRIEF DESCRIPTION OF THE DRAWINGS

Other objects, features, and advantages of the invention, its organization and construction, will be readily apparent from the following description of certain preferred embodiments thereon, taken in conjunction with the accompanying drawings, although variations and modifications may be effected without departing from the spirit and scope of the novel concepts of the disclosure, and in which:

FIG. 1 is an elevational cross-sectional view of a conventional center pipe shaft weldment to which a plurality of spaced-apart longitudinally extending bars have been provided, according to the principles of the present invention, taken along the line I–I of FIG. 2;

FIG. 2 is an end view of the apparatus illustrated in FIG. 1;

FIG. 3 is an elevational view of the interior of a skin assembly showing the troughs and end plate;

FIG. 4 is an end elevational view of the apparatus illustrated in FIG. 3 showing the discharge ends of the troughs in relation to the end plate;

FIG. 5 is an elevational view, shown partially in fragmentary section, of a polydisk filter centershaft in accordance with the principles of the present invention; and FIG. 6 is an end elevational view, shown partially in fragmentary section, of the apparatus illustrated in FIG. 5.

DESCRIPTION OF THE PREFERRED EMBODIMENTS

Referring to the drawings, in FIG. 1 is illustrated a conventional center pipe shaft weldment 10 comprising a shaft 11, a larger diameter shaft 12, and end plate 13 affixed to shaft 11, an intermediate plate 14 affixed to shaft 11, an intermediate plate 15 affixed to shaft 12, and an end plate 16 affixed to shaft 12. A cylindrical member 17 covers the intermediate plates 14 and 15 and the end plate 16 and is suitably affixed thereto. The cylindrical member 17 further extends into and is secured to a cutout 18 of the end plate 13.

A plurality, eight, of axial bars 19 are equally spaced around the cylindrical member 17 and are stitch welded thereto. The bars 19 further extend into the cutout 18 of the end plate 13 and are welded thereto.

The outside diameter of the assembly thus far is provided with a stable reference point in that the bars 19 are machined to a prescribed tolerance. This weldment will receive the skin assemblies which are now formed from a pair of metal plates, preferably stainless steel.

The metal plates 20 have a plurality of rectangular holes 21 formed therein at spacings to provide openings for the filter sectors. Each of these plates is then rolled to form one-half of the outside of the centershaft.

A plurality of U-shaped troughs 22 are formed long enough to extend the length of the skin. These troughs, or channels, are semiautomatically or automatically welded to the inside of the plates 20 covering the sector holes 21. One end, opposite the discharge end of each channel is blocked off with a plate of similar thickness, as referenced at 23.

A semicircular end plate 26 is provided with a corresponding plurality of openings 25 for receiving the discharge ends 24 of the troughs 22. In FIG. 6, attention is invited that the end plates are referenced 26a and 26b. The end plates may be affixed to the assembly by any suitable means, such as for example by plug welding.

The two skin assemblies are now slid over the pipe shaft from one end so that the troughs 22 lie between adjacent ones of the bars 19 and the skin assemblies are plug welded to the bars 19. Provision for the last welding operation may be made for example by forming a plurality of tapped holes 28 for receiving threaded welding pads 29. The two axial seams on the skin assemblies are then welded to form a continuous outer surface of the shaft.

The filter sectors are located by sets of tabs or projections thereon which fit into the rectangular holes 21 of the skin. These filter sectors are clamped to the shafts by rods and utilize a gasket for sealing the sector to the shaft.

The centershaft weldment 10 may be replaced by providing a pair of stub shafts in place of shafts 11 and 12, to which star wheel or sprocket-shaped bulk heads are secured. Each of these assemblies are positioned in one skin assembly and welded in place so that the teeth of the sprockets support the inside of the skin.

Afterward, the other skin assembly is positioned to cover the sprockets and is plug welded to the teeth thereof. The two axial skin joints are then welded and the shafts are welded to the ends of the skin to from a watertight shaft.

Generally, there has been described polydisk filter centershaft apparatus which utilizes a lesser number of parts and steps of fabrication then heretofore known. Accordingly, the material, machining time, and labor expended in providing polydisk filter centershaft apparatus has been greatly reduced from that known through the utilization of prior techniques.

We claim as our invention:

1. Polydisk filter centershaft apparatus comprising:
   shaft means,
   a plurality of support means spaced about and secured to said shaft means; and
   apertured skin means including
      a plurality of apertured members each having an arcuate cross section and secured to said support means to together from a hollow cylindrical skin for receiving filter means at the apertures thereof,
      a plurality of troughs each having a closed end and an open discharge end for filtered liquid, said troughs secured to the interior surface of said skin to cover the apertures thereof, and end plate means secured to an end of said shaft means, said end plate means including openings for receiving the discharge ends of said troughs.

2. The polydisk filter centershaft apparatus defined in claim 1 wherein, said shaft means includes a hollow cylindrical member extending longitudinally of said apparatus, and said plurality of support means includes a plurality of elongate bars extending longitudinally of said cylindrical member and secured thereto.

3. The polydisk filter centershaft apparatus defined in claim 1, wherein said shaft means comprises a pair of axially aligned shafts and a pair of annular members each secured to a shaft and said plurality of support means includes a plurality of projections formed on the periphery of said annular members and secured to said skin.

4. The polydisk filter centershaft apparatus defined in claim 1, wherein each of said troughs has a U-shaped cross section.

5. A method of making polydisk filter centershaft apparatus comprising the steps of
   a. forming a center support for rotational mounting leg securing on each of two shafts at least one annular bulkhead;
   b. providing a plurality of spaced-apart radially extending skin-mounting projections on the center support;
   c. forming at least two apertured skin members of arcuate cross section;
   d. forming a plurality of troughs each having an open end;
   e. securing the troughs on the inner surfaces of the skin members to cover the apertures thereof;
   f. forming a plurality of arcuate end plates with holes therein for receiving the open ends of the troughs;
   g. securing the arcuate end plates to respective ones of the skin members with the open ends of the troughs communicating with the exterior of the apparatus through the holes in the end plates;
   h. securing the plurality of skin members with the attached troughs and end plates to form a generally cylindrical skin; and
   i. sealing the adjacent edges of the skin members.

6. A method according to claim 5 wherein steps (a) and (b) are further defined as forming a plurality of sprocket-shaped bulkheads and securing the bulkheads to the shafts.

7. A method according to claim 5, wherein steps (a) and (b) are further defined as securing the annular bulkheads within a hollow cylindrical member and securing a plurality of elongate bars longitudinally of and at equal spacing about the hollow cylindrical member.

8. A method according to claim 7 wherein the steps of securing the longitudinal bars is further defined as welding the bars to the cylindrical member.

9. A method according to claim 5, wherein the step of securing the skin members to the mounting projections is further defined as plug welding the skin members to the mounting projections.

10. A method according to claim 5, wherein the steps of forming the skin members is further defined as rolling flat plates into arcuate cross section.